United States Patent
Yano et al.

(10) Patent No.: US 11,928,618 B2
(45) Date of Patent: Mar. 12, 2024

(54) TRANSPORT ALLOCATION PLANNING SYSTEM, INFORMATION PROCESSING APPARATUS, AND METHOD FOR CONTROLLING TRANSPORT ALLOCATION PLANNING SYSTEM

(71) Applicant: HITACHI, LTD., Tokyo (JP)

(72) Inventors: Kojin Yano, Tokyo (JP); Satoru Hori, Tokyo (JP); Kei Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 458 days.

(21) Appl. No.: 17/270,463

(22) PCT Filed: Oct. 1, 2019

(86) PCT No.: PCT/JP2019/038718
§ 371 (c)(1),
(2) Date: Feb. 23, 2021

(87) PCT Pub. No.: WO2020/071352
PCT Pub. Date: Apr. 9, 2020

(65) Prior Publication Data
US 2021/0325199 A1    Oct. 21, 2021

(30) Foreign Application Priority Data
Oct. 3, 2018    (JP) .................................. 2018-188055

(51) Int. Cl.
*G06Q 10/0631* (2023.01)
*G01C 21/34* (2006.01)
(Continued)

(52) U.S. Cl.
CPC ..... *G06Q 10/0631* (2013.01); *G01C 21/3438* (2013.01); *G01C 21/3484* (2013.01);
(Continued)

(58) Field of Classification Search
CPC ............... G06Q 10/0631; G06Q 50/30; G01C 21/3438; G01C 21/3484; G01C 21/3492; G06F 18/23; G06N 20/00; G08G 1/202
See application file for complete search history.

(56) References Cited

U.S. PATENT DOCUMENTS

2004/0107110 A1 * 6/2004 Gottlieb ............. G06Q 30/0283
705/400
2010/0057350 A1 3/2010 Joly et al.
(Continued)

FOREIGN PATENT DOCUMENTS

JP    6310606 B1    4/2018
JP    6341352 B1    6/2018

OTHER PUBLICATIONS

International Search Report of PCT/JP2019/038718 dated Nov. 19, 2019.
(Continued)

*Primary Examiner* — Donald J Wallace
(74) *Attorney, Agent, or Firm* — MATTINGLY & MALUR, PC

(57) ABSTRACT

The transport allocation planning system includes a transport allocation planning apparatus that creates a transport allocation plan and a user apparatus communicably connected to the transport allocation planning apparatus. The transport allocation planning apparatus transmits an inquiry related to a movement demand of the user to the user apparatus, receives an answer to the inquiry, estimates a movement demand of the user based on the answer, and creates a transport allocation plan based on the estimated movement demand. The user apparatus stores sensor information that is information indicating a current state or a past state of the user apparatus and a utility calculation model for calculating utility of the user during a movement, calculates the utility of the user by applying the sensor information to
(Continued)

the utility calculation model, generates an answer to the inquiry based on the calculated utility, and transmits the generated answer to the transport allocation planning apparatus.

15 Claims, 10 Drawing Sheets

(51) Int. Cl.
  *G06F 18/23* (2023.01)
  *G06N 20/00* (2019.01)
(52) U.S. Cl.
  CPC ......... *G01C 21/3492* (2013.01); *G06F 18/23* (2023.01); *G06N 20/00* (2019.01)

(56) References Cited

U.S. PATENT DOCUMENTS

| | | | |
|---|---|---|---|
| 2011/0125794 A1* | 5/2011 | Hutschemaekers | G08G 1/202 707/E17.014 |
| 2015/0176997 A1 | 6/2015 | Pursche et al. | |
| 2018/0211186 A1* | 7/2018 | Rakah | G06V 20/593 |
| 2018/0349850 A1* | 12/2018 | Hosoda | G06Q 10/08355 |
| 2020/0249047 A1* | 8/2020 | Balva | G06Q 10/0631 |
| 2021/0132616 A1* | 5/2021 | McQuillan | G06Q 10/06312 |

OTHER PUBLICATIONS

Extended European Search Report received in corresponding European Application No. 19868811.1 dated Jun. 3, 2022.

* cited by examiner

[FIG. 1]
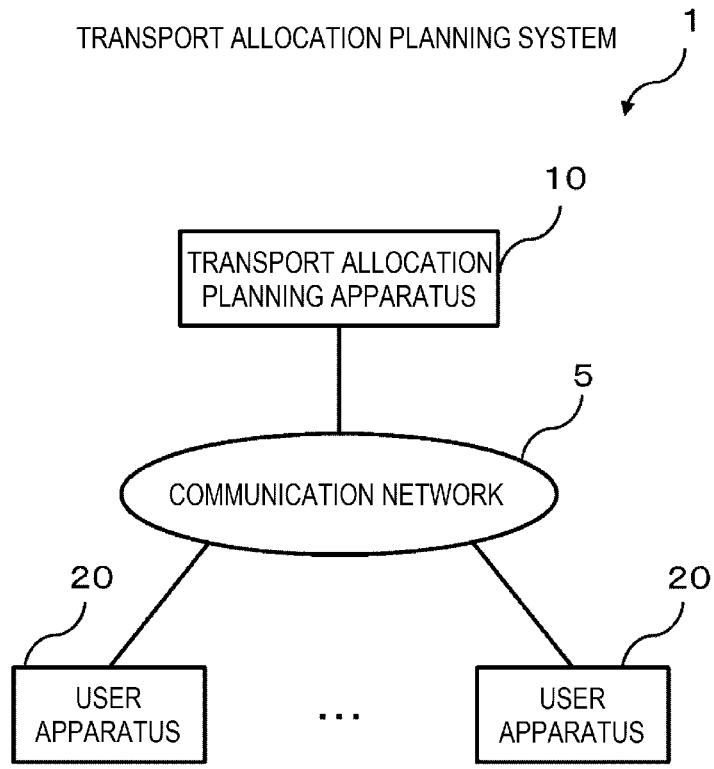
[FIG. 2]
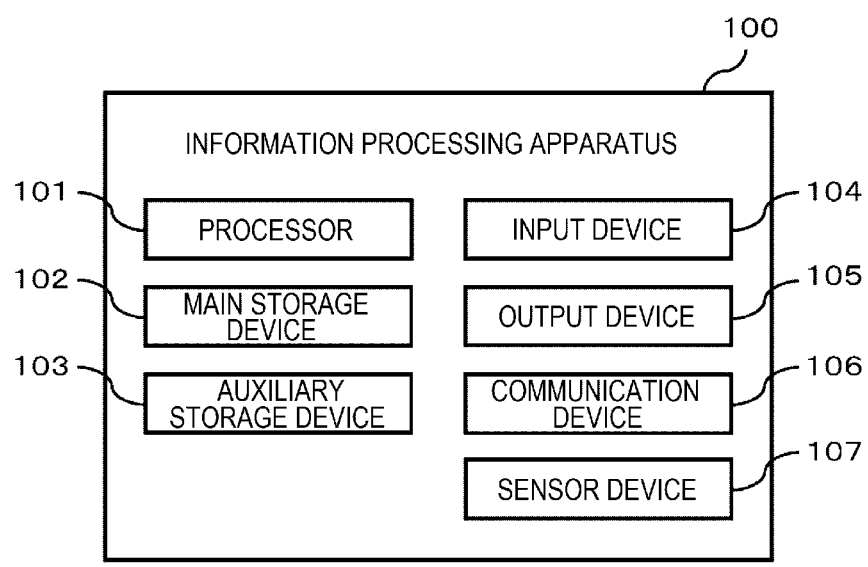

[FIG. 3]
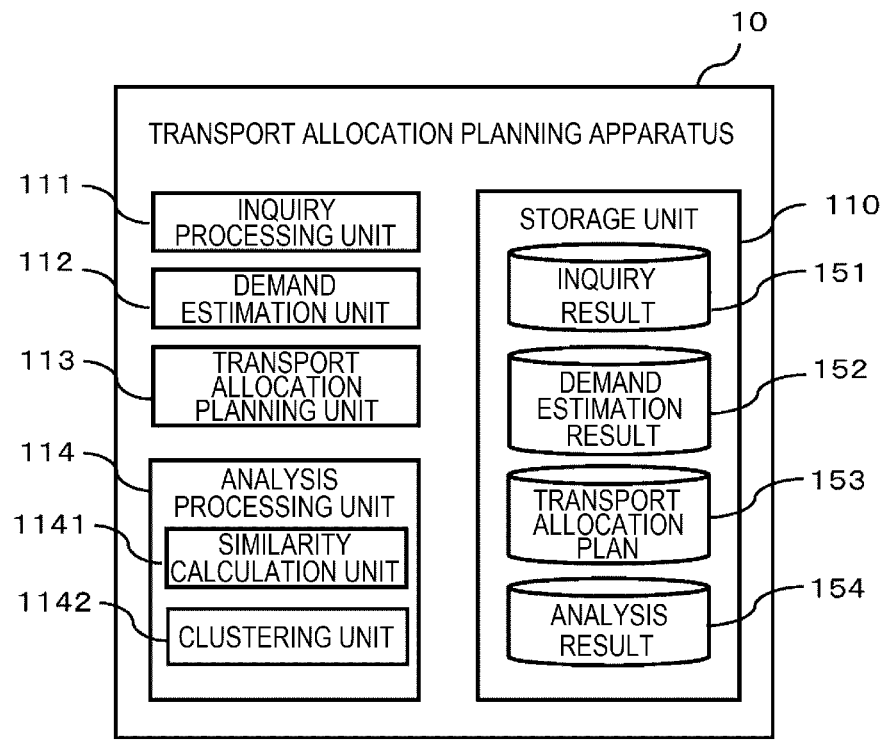
[FIG. 4]
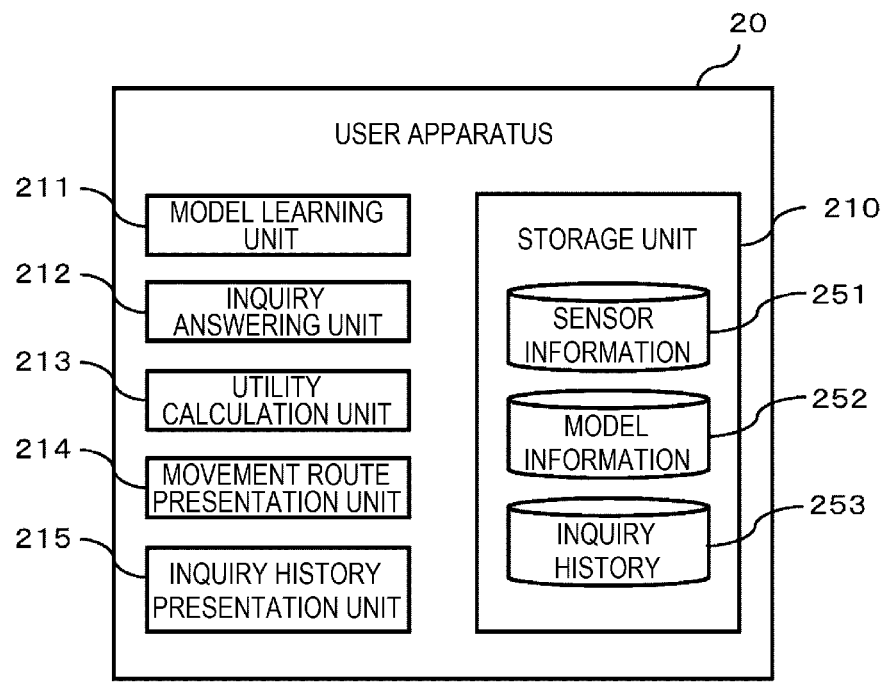

[FIG. 5]
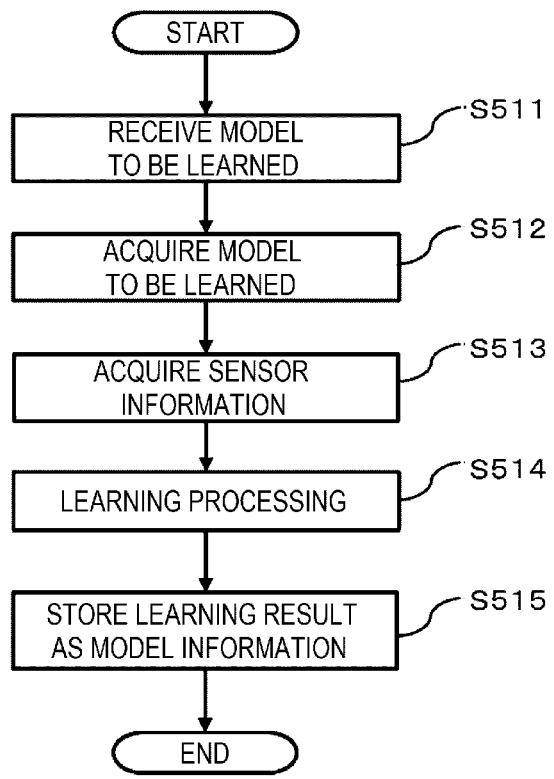

[FIG. 6]

$$f_0(X) = a_{01}x_{01} + a_{02}x_{02} + a_{03}x_{03} + \cdots + a_{0n}x_{0n}$$

$$f_1(X) = a_{11}x_{11} + a_{12}x_{12} + a_{13}x_{13} + \cdots + a_{1n}x_{1n}$$

$$\vdots$$

$$f_m(X) = a_{m1}x_{m1} + a_{m2}x_{m2} + a_{m3}x_{m3} + \cdots + a_{mn}x_{mn}$$

601

$$(s_k, t_{01k}, t_{02k}, t_{03k}, \ldots, t_{0nk})$$ 602

$$s_k = f_0(X) = a_{01}t_{01k} + a_{02}t_{02k} + a_{03}t_{03k} + \cdots + a_{0n}t_{0nk}$$

$$s_{k+1} = f_0(X) = a_{01}t_{01k+1} + a_{02}t_{02k+1} + a_{03}t_{03k+1} + \cdots + a_{0n}t_{0nk+1}$$

603

[FIG. 7]
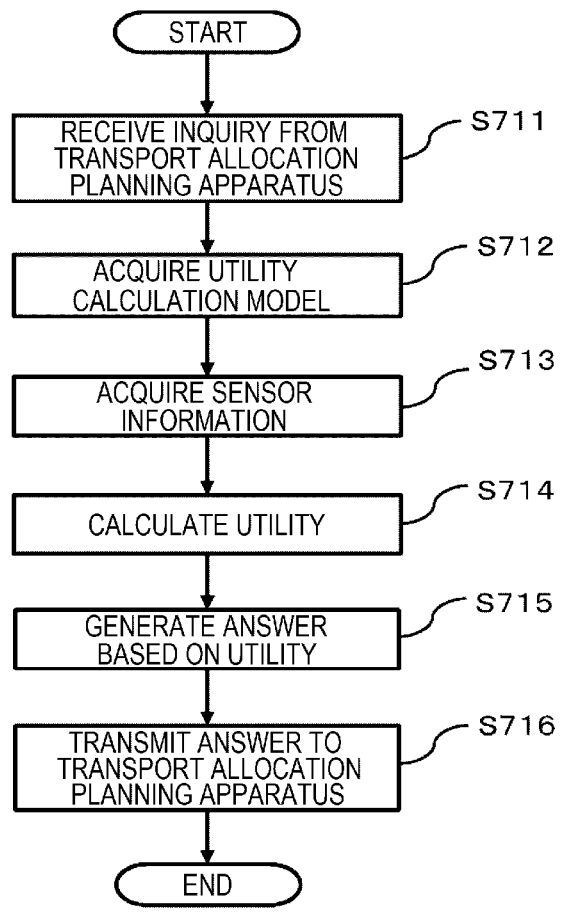

[FIG. 8]

INQUIRY HISTORY 253

| DATE AND TIME | TYPE | INQUIRY CONTENT | ANSWER |
|---|---|---|---|
| 2020/3/5 17:15:30 | TIME FOR WAITING FOR A BUS | CAN YOU WAIT FOR A BUS UP TO 10 MINUTES? | OK |
| 2020/6/8 12:30:30 | TIME FOR WAITING FOR A BUS | CAN YOU WAIT FOR A BUS UP TO 15 MINUTES? | NG |
| : | : | : | : |
| 2021/3/21 11:25:45 | TRANSPORTATION MEANS | IS IT OK TO RIDE A BIKE? | OK |
| : | : | : | : |

811, 812, 813, 814

[FIG. 9]
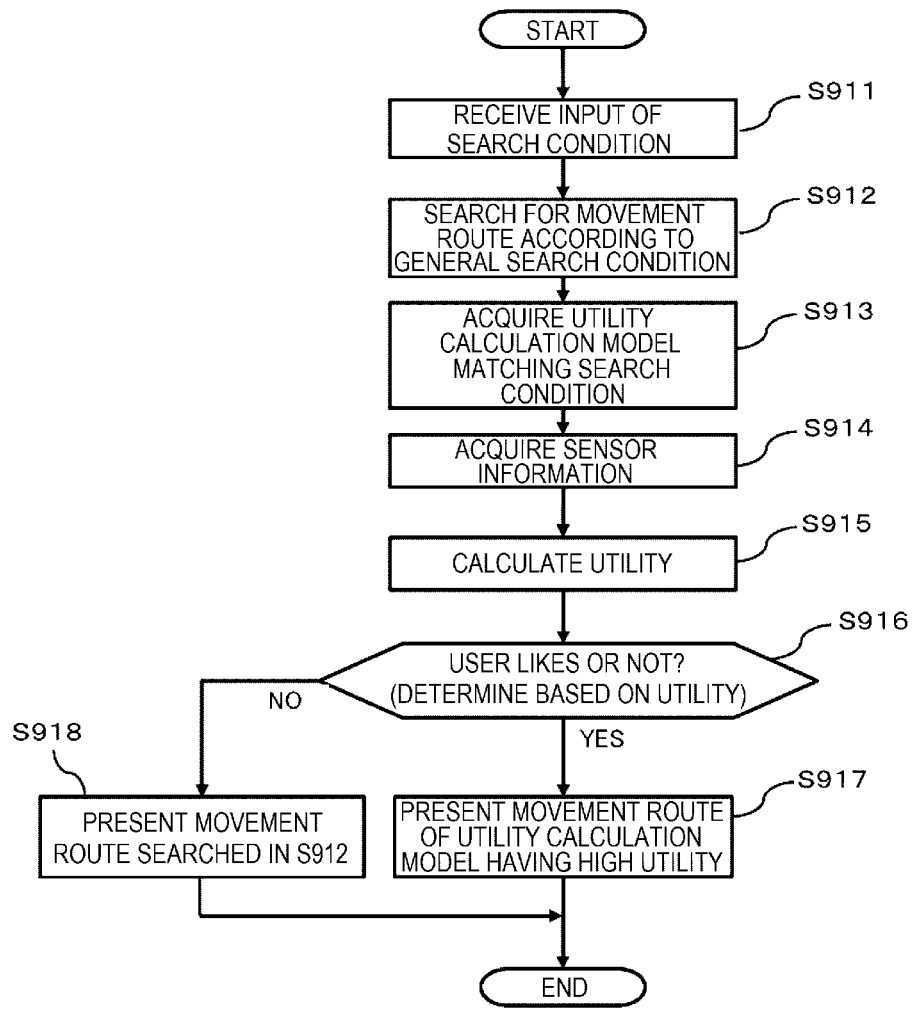

[FIG. 10]
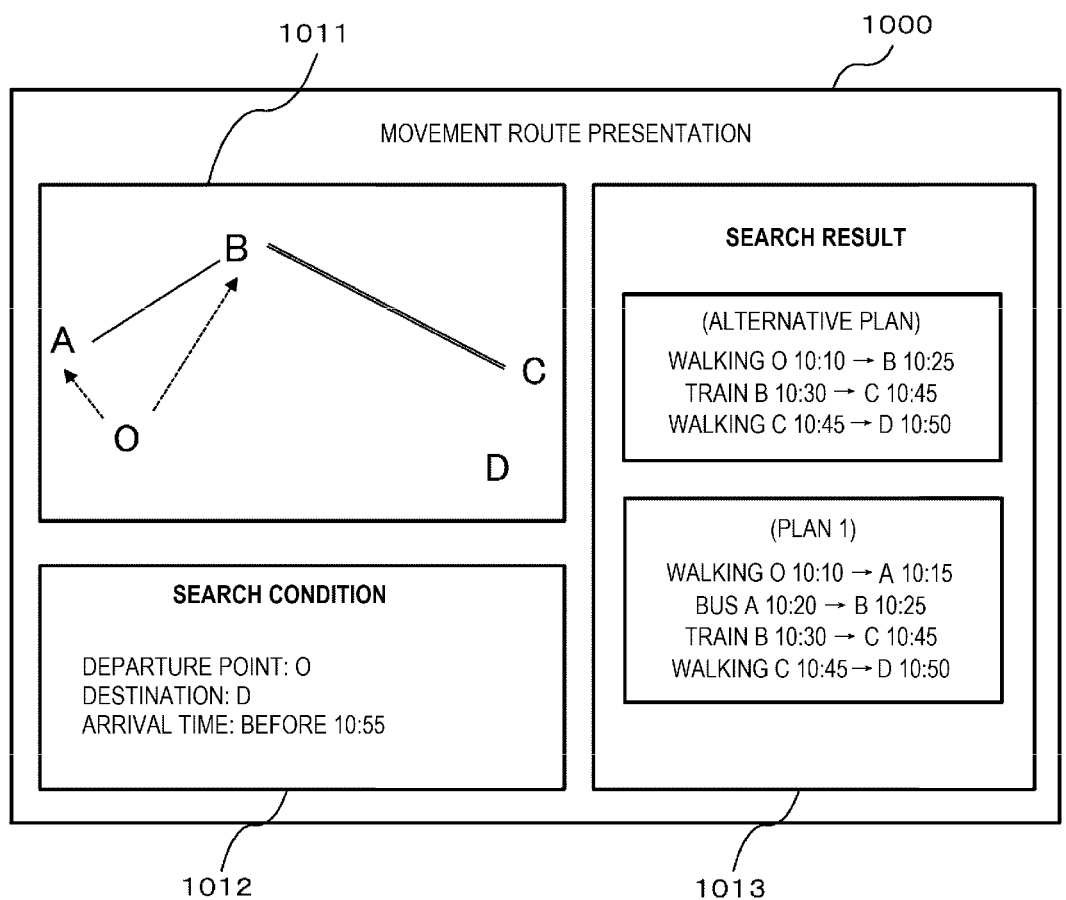

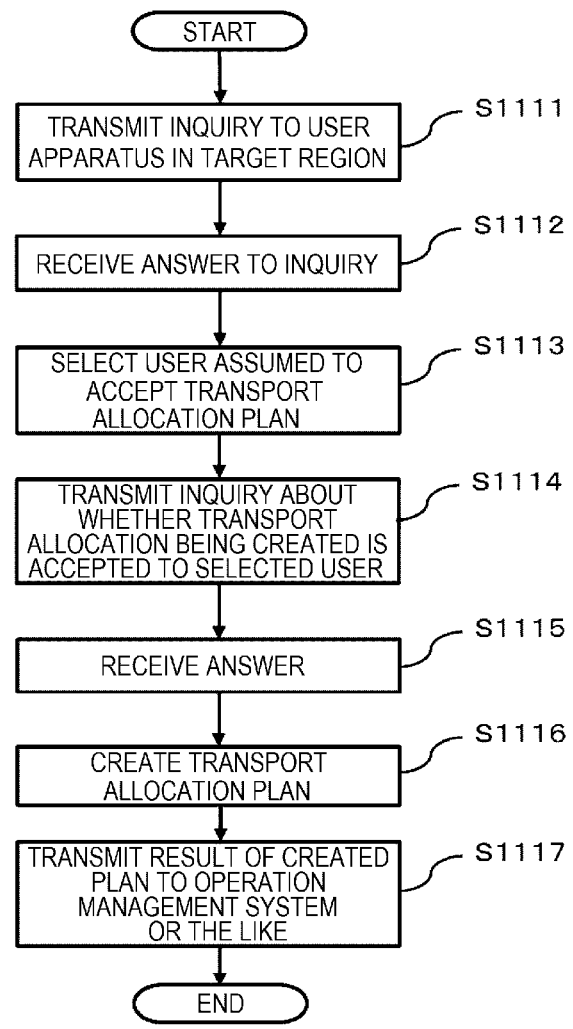

[FIG. 12]
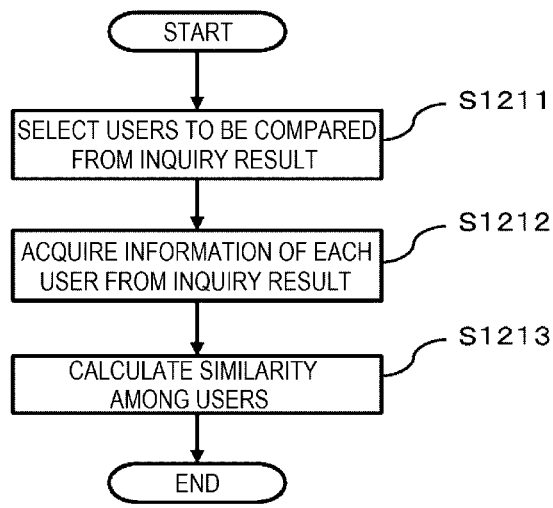
[FIG. 13]
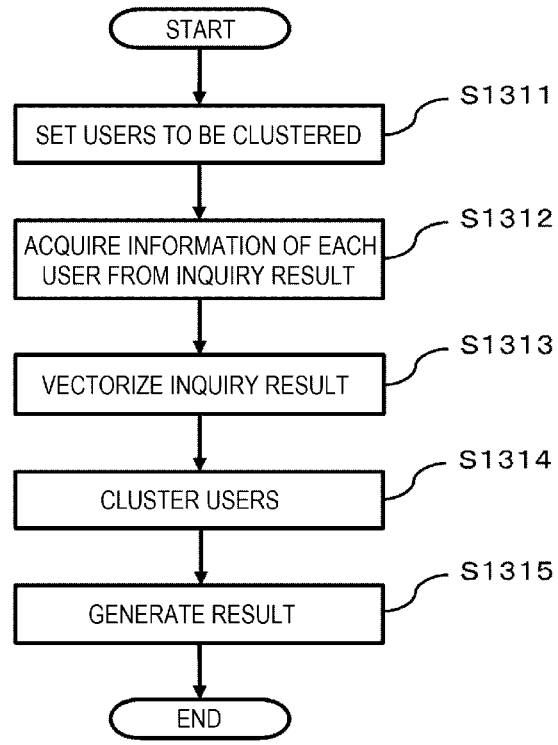

TRANSPORT ALLOCATION PLANNING SYSTEM, INFORMATION PROCESSING APPARATUS, AND METHOD FOR CONTROLLING TRANSPORT ALLOCATION PLANNING SYSTEM

TECHNICAL FIELD

The present invention relates to a transport allocation planning system, an information processing apparatus, and a method for controlling a transport allocation planning system for a transportation facility.

BACKGROUND ART

This application claims priority based on Japanese Patent Application No. 2018-188055 filed on Oct. 3, 2018, the disclosure of which is incorporated herein by reference.

With the development of information and communication technology (ICT), a transport allocation plan of a transportation facility such as a bus or a taxi is created more dynamically and flexibly than that in the related art. How to create a plan according to a user intention is a problem needs to be solved in a transport allocation plan.

PTL 1 discloses an on-demand transportation operation system configured for a purpose of efficiently operating on-demand transportation vehicles and creating a transport allocation plan for on-demand transportation vehicles that receives usage requests of more passengers. The on-demand transportation operation system receives itinerary requests of a plurality of passengers, the itinerary request includes at least any one of desired departure time and desired arrival time of a shared on-demand transportation vehicle, a departure point, and a destination, and the on-demand transportation operation system creates a transport allocation plan for on-demand transportation vehicles by classifying the plurality of passengers according to a predetermined condition that the itinerary request is received before predetermined time and the desired arrival time or the desired departure time is within a predetermined period of time.

PTL 2 discloses a boarding intension determination device configured for a purpose of efficiently carrying a user who uses a transportation facility to a destination while increasing convenience for the user. The boarding intension determination device acquires a positional relationship between boarding position information indicating a boarding spot for boarding a mobile object and user position information indicating a current position of the user, determines whether the user has an intention to board the mobile object based on the acquired positional relationship and behavior information indicating a user behavior, and determines that the user has an intention to board the mobile object in a case where the user views content about the boarding spot for boarding the mobile object, serving as a case where the behavior information indicating the user behavior satisfies predetermined condition information.

CITATION LIST

Patent Literature

PTL 1: Japanese Patent No. 6341352
PTL 2: Japanese Patent No. 6310606

SUMMARY OF INVENTION

Technical Problem

In PTL 1 and PTL 2, information about a user behavior such as a departure point, a destination, and a current position is transmitted to a system. In recent years, due to increased awareness of personal information protection and privacy protection, restrictions on handling personal information and privacy-related information have become more severe year by year. Therefore, it is expected that, in the future, it will be difficult to implement a system based on a premise that information related to a user behavior is collected by a business operator as in PTL 1 and PTL 2.

The invention has been made in view of such a background, and an object of the invention is to provide a transport allocation planning system, an information processing apparatus, and a method for controlling a transport allocation planning system capable of creating a transport allocation plan according to a user intention while considering handling of information related to a user behavior.

Solution to Problem

In order to solve the problems described above, the invention provides a transport allocation planning system. The transport allocation planning system includes a transport allocation planning apparatus that is an information processing apparatus which creates a transport allocation plan of a transportation facility; and a user apparatus that is an information processing apparatus which is communicably connected to the transport allocation planning apparatus and which is operated by a user of the transportation facility. The transport allocation planning apparatus includes an inquiry processing unit that transmits, to the user apparatus, an inquiry related to a movement demand which is information indicating an intention related to a movement of the user, and receives an answer to the inquiry; a demand estimation unit that estimates a movement demand of the user based on the answer; and a transport allocation planning unit that creates a transport allocation plan based on the estimated movement demand. The user apparatus includes a storage unit that stores sensor information that is information indicating a current state or a past state of the user apparatus and a utility calculation model for calculating utility of the user during a movement; a utility calculation unit that calculates the utility of the user by applying the sensor information to the utility calculation model; and an inquiry answering unit that generates, based on the utility, an answer to the inquiry received from the transport allocation planning apparatus, and transmits the generated answer to the transport allocation planning apparatus.

Other problems disclosed by the present application and methods for solving such problems will become apparent based on descriptions of embodiments and drawings.

Advantageous Effect

According to the invention, a transport allocation plan can be created according to a user intention while considering handling of information related to a user behavior.

BRIEF DESCRIPTION OF DRAWINGS

FIG. 1 is a diagram showing a schematic configuration of a transport allocation planning system.
FIG. 2 shows an example of hardware constituting a transport allocation planning apparatus or a user apparatus.
FIG. 3 is a diagram showing main functions of the transport allocation planning apparatus.
FIG. 4 is a diagram showing main functions of the user apparatus.
FIG. 5 is a flowchart showing a learning processing.

FIG. 6 shows examples of a utility calculation model, sensor information, and simultaneous equations.

FIG. 7 is a flowchart showing an inquiry answering processing.

FIG. 8 shows an example of inquiry history.

FIG. 9 is a flowchart showing a movement route presentation processing.

FIG. 10 shows an example of a movement route presentation screen.

FIG. 11 is a flowchart showing a transport allocation plan creation processing.

FIG. 12 is a flowchart showing a similarity calculation processing.

FIG. 13 is a flowchart showing a clustering processing.

DESCRIPTION OF EMBODIMENTS

Hereinafter, embodiments will be described with reference to the drawings. In the following description, common components are denoted by common reference numerals, and a repetitive description thereof may be omitted.

FIG. 1 shows a schematic configuration of a transport allocation planning system 1 according to an embodiment. As shown in FIG. 1, the transport allocation planning system 1 includes a transport allocation planning apparatus 10 that creates a transport allocation plan for a vehicle of a transportation facility (such as a route bus, a shuttle bus, an on-demand bus, a taxi, and a shared bike), and one or more user apparatuses 20 that are communicably connected with the transport allocation planning apparatus 10 via a communication network 5. The communication network 5 is a wireless or wired communication unit, and is the Internet, a mobile phone network, a local area network (LAN), a wide area network (WAN), a dedicated line, or the like.

The transport allocation planning apparatus 10 is an information processing apparatus (computer) managed by an administrator of an organization such as a transportation operator, and is a personal computer, a server device, a mainframe, or the like. The transport allocation planning apparatus 10 inquires of the user apparatus 20 about a movement demand that is information indicating a user intention (selection of a movement means and selection of a movement route) related to a movement (a movement from a departure point to a destination), and receives an answer to the inquiry that is transmitted from the user apparatus 20. The transport allocation planning apparatus 10 estimates a user movement demand based on the received answer and creates a transport allocation plan based on the estimated result. The answer to the inquiry does not include information related to a user behavior (information that may correspond to personal information or privacy-related information).

The user apparatus 20 is an information processing apparatus (computer) used by a user of a transportation facility, and is a smartphone, a tablet, a mobile phone, a personal computer, or the like. The user apparatus 20 provides information related to a transportation facility and various services to the user.

FIG. 2 shows an example of hardware (hereinafter, referred to as an information processing apparatus 100) constituting the transport allocation planning apparatus 10 or the user apparatus 20. As shown in FIG. 2, the information processing apparatus 100 includes a processor 101, a main storage device 102, an auxiliary storage device 103, an input device 104, an output device 105, and a communication device 106. The information processing apparatus 100 constituting the user apparatus 20 further includes a sensor device 107 in addition to the above configuration. Components of the information processing apparatus 100 are communicably connected to one another via a communication unit such as a bus (not shown). All or a part of the components of the information processing apparatus 100 may be implemented by a virtual resource such as a cloud server of a cloud system.

The processor 101 is implemented by a central processing unit (CPU), a micro processing unit (MPU), or the like. The processor 101 reads and executes a program stored in the main storage device 102, thereby implementing functions of the transport allocation planning apparatus 10 or the user apparatus 20.

The main storage device 102 is a device that stores a program or data, and is a read only memory (ROM), a random access memory (RAM), a non-volatile semiconductor memory ((Non Volatile RAM) NVRAM), or the like.

The auxiliary storage device 103 is a non-volatile memory (NVRAM) of various types such as a solid state drive (SSD) and an SD memory card; a hard disk drive; an optical storage device (such as a compact disc (CD) and a digital versatile disc (DVD)); a storage area of a cloud server, or the like. The program or data stored in the auxiliary storage device 103 is read into the main storage device 102 as needed.

The input device 104 is an interface for receiving an input of information, and is a keyboard, a mouse, a touch panel, a card reader, a microphone, or the like. The information processing apparatus 100 may receive an input of information from another apparatus via the communication device 106. The sensor device 107 may function as the input device 104.

The output device 105 is an interface for outputting various kinds of information, and is a screen display device (such as a liquid crystal monitor, a liquid crystal display (LCD), and a graphic card), a printing device, an audio output device (such as a speaker), or the like. The information processing apparatus 100 may be configured to output information to another apparatus via the communication device 106.

The communication device 106 is a wired or wireless communication interface that achieves communication with another device via the communication network 5, and is a network interface card (NIC), a wireless communication module, a universal serial interface (USB) module, a serial communication module, or the like.

The sensor device 107 is, for example, a self-position detection sensor (such as a global positioning system (GPS) sensor and Wi-Fi), an acceleration sensor, a gyro sensor, an orientation sensor, or the like, and outputs information (hereinafter, referred to as sensor information) related to a user state such as a current position of the user apparatus 20.

FIG. 3 shows main functions of the transport allocation planning apparatus 10. As shown in FIG. 3, the transport allocation planning apparatus 10 has functions of a storage unit 110, an inquiry processing unit 111, a demand estimation unit 112, a transport allocation planning unit 113, and an analysis processing unit 114.

Among the functions, the storage unit 110 stores an inquiry result 151, a demand estimation result 152, a transport allocation plan 153, and an analysis result 154.

The inquiry processing unit 111 transmits an inquiry to the user apparatus 20 existing in a target region of a transport allocation plan (hereinafter, referred to as a target region) and receives an answer transmitted from the user apparatus 20. The answer received by the inquiry processing unit 111 is stored in the storage unit 110 as the inquiry result 151.

The demand estimation unit 112 estimates a movement demand of the user based on the answer (inquiry result 151). The estimated movement demand includes, for example, information obtained by associating information for specifying a spot (such as a bus stop, a taxi stop, and a shared bike parking lot) with information (a demand quantity) indicating the quantity of the movement demands at the spot. The movement demand estimated by the demand estimation unit 112 is stored in the storage unit 110 as the demand estimation result 152.

Based on the demand estimation result 152, the transport allocation planning unit 113 creates a transport allocation plan while considering a resource of a transportation facility (such as the number of owned vehicles). The transport allocation planning apparatus 10 is communicably connected to, for example, an operation management system of a transportation facility, and transmits the created transport allocation plan to the operation management system as needed. The transport allocation plan created by the transport allocation planning unit 113 is stored in the storage unit 110 as the transport allocation plan 153.

The analysis processing unit 114 analyzes the inquiry result 151. As shown in FIG. 3, the analysis processing unit 114 includes a similarity calculation unit 1141 and a clustering unit 1142. The similarity calculation unit 1141 calculates similarity among users based on the inquiry result 151. The clustering unit 1142 executes user clustering (classification) based on the inquiry result 151. A result of a data analysis executed by the analysis processing unit 114 is stored in the storage unit 110 as the analysis result 154. The analysis result 154 is used in, for example, estimation of the movement demand performed by the demand estimation unit 112 or creation of the transport allocation plan performed by the transport allocation planning unit 113.

FIG. 4 shows main functions of the user apparatus 20. As shown in FIG. 4, the user apparatus 20 has functions of a storage unit 210, a model learning unit 211, an inquiry answering unit 212, a utility calculation unit 213, a movement route presentation unit 214, and an inquiry history presentation unit 215.

Among the above functions, the storage unit 210 stores sensor information 251, model information 252, and inquiry history 253.

The model learning unit 211 executes learning (machine learning) of a utility calculation model to be described later. The storage unit 210 stores the utility calculation model to be learned or a result of the learning as the model information 252.

The inquiry answering unit 212 receives the inquiry transmitted from the transport allocation planning apparatus 10, generates an answer to the received inquiry, and transmits the generated answer to the transport allocation planning apparatus 10. During generating of the answer, the inquiry answering unit 212 uses a utility calculation model that is a model for calculating utility of the user and is stored in the storage unit 210 as the model information 252. The inquiry answering unit 212 generates the answer by determining the utility calculated by the utility calculation model. The determination is executed, for example, by comparing the utility with a preset threshold or numerical range.

The utility calculation unit 213 calculates the utility by applying the sensor information 251 to the utility calculation model. The model information 252 includes a list of models to be used as indexes and content of the models. The sensor information 251 includes real-time sensor information acquired by the sensor device 107 and sensor information acquired in the past by the sensor device 107.

The movement route presentation unit 214 generates a movement route from a departure point to a destination by a predetermined route search algorithm (such as a hill climbing method, a simulated annealing method, a genetic algorithm, and a tabu search) and presents the generated movement route to the user. The movement route presentation unit 214 generates a movement route estimated to be preferable for the user by using the utility calculation model and presents the generated movement route to the user.

The inquiry history presentation unit 215 outputs content of the inquiry history 253 to the output device 105 and presents the content to the user.

FIG. 5 is a flowchart showing a processing (hereinafter, referred to as a learning processing S500) of estimating the utility calculation model by the model learning unit 211 of the user apparatus 20. Hereinafter, the learning processing S500 will be described with reference to FIG. 5. The learning processing S500 is executed, for example, when an operation for instructing the input device 104 to start learning of the utility calculation model is executed. The learning processing S500 is started when, for example, an instruction for starting the learning of the utility calculation model is received from the transport allocation planning apparatus 10.

As shown in FIG. 5, first, the model learning unit 211 receives designation of a utility calculation model to be learned via the input device 104 (S511).

Subsequently, the model learning unit 211 acquires the designated utility calculation model from the model information 252 (S512).

Subsequently, the model learning unit 211 acquires sensor information to be used in the learning from the sensor information 251 (S513).

Subsequently, the model learning unit 211 executes learning by applying the sensor information 251 acquired in step S513 to the utility calculation model acquired in step S512 (S514). Details of the learning will be described later.

Subsequently, the model learning unit 211 stores a learning result as the model information 252 (S515).

FIG. 6 shows an example of the utility calculation model. Although a utility calculation model 601 represented by a linear formula is shown here, the form of the utility calculation model is not necessarily limited thereto.

Each of a group of calculation equations in the utility calculation model 601 shown in FIG. 6 is a calculation equation of utility $f_i(x)$ ($i=0, 1, 2 \ldots m$) set for each user option such as "taking a bus" and "walking". When an option is, for example, "taking a bus", terms at a right side of the calculation equation (for example, $a01 \times x01$, $a02 \times x02 \ldots a0n \times x0n$) are "utility of a bus moving time", "non-utility of a bus waiting time", "non-utility of a time for getting on a bus", and the like. When an option is, for example, "walking", terms at a right side of the calculation equation (for example, $a11 \times x11$, $a12 \times x12 \ldots a1n \times x1n$) are "utility of a walking time", "non-utility of fatigue due to walking", "utility of user health awareness", and the like. Information of the terms at the right side of the calculation equation is acquired based on information related to a destination or a movement distance of a user, weather, an accompanying person, operation delay information acquired from an operation management system, and the like.

The learning of the utility calculation model is executed by determining variables ($a01 \times x02 \ldots a12 \times x12 \ldots$) at the right side of the above calculation equations based on the sensor information. In a reference numeral 602 in FIG. 6, sk which is an example of sensor information is an objective variable, and t01k, t02k, t03k . . . t0nk are other kinds of sensor information (explanatory variables).

In FIG. 6, a reference numeral 603 denotes simultaneous equations obtained by substituting the sensor information 602 at certain timing or in a certain scene into the above calculation equations. A coefficient aij is calculated as a learning result by solving the simultaneous equations.

As described above, in the transport allocation planning system 1 according to the present embodiment, since the learning of the utility calculation model is executed in the user apparatus 20, it is not necessary to transmit sensor information which may include personal information or privacy-related information to the transport allocation planning apparatus 10 for the learning. For example, management (storage or version management) of the utility calculation model before the learning may be executed collectively in the transport allocation planning apparatus 10. For example, the utility calculation model may be transmitted from the transport allocation planning apparatus 10 to the user apparatus 20 as needed.

FIG. 7 is a flowchart showing a processing (hereinafter, referred to as an inquiry answering processing S700) executed when the inquiry answering unit 212 of the user apparatus 20 generates an answer to the inquiry received from the transport allocation planning apparatus 10 and transmits the generated answer to the transport allocation planning apparatus 10. Hereinafter, the inquiry answering processing S700 will be described with reference to FIG. 7.

The inquiry answering processing S700 is started when the inquiry answering unit 212 receives an inquiry from the transport allocation planning apparatus 10 (S711). The inquiry includes information for designating one or more utility calculation models to be used by the user apparatus 20 during generation of the answer.

When the inquiry is received, first, the inquiry answering unit 212 acquires, from the model information 252, the utility calculation model designated in the inquiry (S712).

Subsequently, the utility calculation unit 213 acquires sensor information from the sensor device 107 (S713).

Subsequently, the utility calculation unit 213 calculates utility by applying the sensor information 251 acquired in step S713 to a utility calculation model acquired in step S712 (S714). Here, the sensor information may use current sensor information, or may use past sensor information stored in the storage unit 210 in some cases. When there are a plurality of utility calculation models designated in the inquiry, the utility calculation unit 213 calculates, for example, utility of each of the utility calculation models, selects a utility calculation model having highest utility among the utility calculation models, and generates an answer by using the selected utility calculation model.

Subsequently, the inquiry answering unit 212 generates, based on the calculated utility, an answer to the inquiry received in S711. For example, when contents of the inquiry is "Can you wait for a bus up to 10 minutes?", the inquiry answering unit 212 generates information indicating "OK" as the answer if, for example, the calculated utility exceeds a preset threshold, and otherwise, generates information indicating "NG" as the answer (S715).

Subsequently, the inquiry answering unit 212 transmits the generated answer to the transport allocation planning apparatus 10 (S716).

The storage unit 210 stores, as the inquiry history 253, the answer in association with the contents of the inquiry received from the transport allocation planning apparatus 10 in step S711. In the transport allocation planning apparatus 10, the storage unit 110 stores the answer received from the user apparatus 20 as the inquiry result 151.

As described above, according to the transport allocation planning system 1 of the present embodiment, information related to a movement demand of the user can be acquired by the transport allocation planning apparatus 10 without transmitting information related to a user behavior (personal information or privacy-related information) to the transport allocation planning apparatus 10. The utility calculation model to be used during generation of an answer is designated from the transport allocation planning apparatus 10 to the user apparatus 20 in the present embodiment, and information according to an intention of creating a transport allocation plan can be acquired from the user apparatus 20 by making such a designation.

FIG. 8 shows an example of the inquiry history 253. As shown in FIG. 8, the inquiry history 253 includes one or more records including items of date and time 811, a type 812, an inquiry content 813, and an answer 814. Each record of the inquiry history 253 corresponds to one inquiry. The inquiry result 151 of the transport allocation planning apparatus 10 also includes information similar to the inquiry history 253. Each record of the inquiry result 151 of the transport allocation planning apparatus 10 further includes information (hereinafter, referred to as a user ID) for identifying a user (user apparatus 20) of an inquiry destination.

Among these items, date and time when the inquiry is received is set in the date and time 811. Information indicating a type of the inquiry is set in the type 812. Contents of the inquiry received from the transport allocation planning apparatus 10 are set in the inquiry content 813. Contents of the answer generated in S715 in FIG. 7 are set in the answer 814.

In response to a request from the user via the input device 104, the inquiry history presentation unit 215 of the user apparatus 20 outputs the inquiry history 253 to the output device 105 and presents (visualizes) the inquiry history 253 to the user. Therefore, the user can check what kind of inquiry was received from the transport allocation planning apparatus 10 in the past, and what kind of answer to the received inquiry was returned to the transport allocation planning apparatus 10 (what kind of utility calculation model was built in the user apparatus 20 and what kind of content was transmitted to the transport allocation planning apparatus 10). Therefore, for example, the user can determine whether an answer different from an intention of the user is transmitted to the transport allocation planning apparatus 10.

FIG. 9 is a flowchart showing a processing (hereinafter, referred to as a movement route presentation processing S900) executed when the movement route presentation unit 214 of the user apparatus 20 presents a movement route to the user. Hereinafter, the movement route presentation processing S900 will be described with reference to FIG. 9. The movement route presentation processing S900 is executed, for example, when the user searches for a movement route using a movement route search function provided by the user apparatus 20.

First, the movement route presentation unit 214 receives an input of a search condition of a movement route via the input device 104 (S911). The search condition includes a search condition related to a user intention such as "preference for walking", "waiting for 10 minutes or less", and "preference for a low price" in addition to a general search condition (a departure point, a destination, a via-point, a transportation means, departure time, arrival time, and the like) necessary for searching for a movement route.

Subsequently, the movement route presentation unit 214 searches for a movement route based on the received search condition, and stores a search result (S912).

Subsequently, the movement route presentation unit 214 acquires, from the model information 252, a utility calculation model matching the search condition received in S911 (S913).

Subsequently, the movement route presentation unit 214 acquires the sensor information 251 (S914), and calculates utility by applying the acquired sensor information 251 to the utility calculation model acquired in S913 (S915).

Subsequently, the movement route presentation unit 214 determines whether the user likes the movement route of the model based on the utility calculated in S915 (S916). For example, the movement route presentation unit 214 determines "whether the user selects walking under a current situation (for example, raining)" by using the utility calculation model related to a movement means corresponding to a search condition of "preference for walking". For example, the movement route presentation unit 214 determines whether the user likes the movement route of the model based on whether the utility calculated in S915 exceeds a preset threshold. When a plurality of models are acquired in step S913, the movement route presentation unit 214 executes determination for each of the utility calculation models.

When it is determined that the user likes the movement route of the utility calculation model (S916: YES), the movement route presentation unit 214 presents the movement route of the utility calculation model to the user via the output device 105. For example, when utility of a movement route (utility calculation model) using a movement means such as a bus and a taxi instead of walking is high, the movement route presentation unit 214 presents the movement route of a bus or a taxi in preference to a movement route of walking to the user. When a plurality of models are acquired in step S913, the movement route presentation unit 214 may present all movement routes determined to be liked by the user, or may preferentially present movement routes of a predetermined number of utility calculation models having high utility.

In step S916, when it is determined that the user does not like the movement route of the utility calculation model (S916: NO), the movement route presentation unit 214 presents a movement route searched in S912 to the user via the output device 105.

FIG. 10 shows an example of a screen (hereinafter, referred to as a movement route presentation screen 1000) displayed on the output device 105 by the movement route presentation unit 214 in the processings from S916 to S918 in FIG. 9. In FIG. 10, a diagram showing a movement route is displayed in a display field denoted by a reference numeral 1011. In the display field, O represents a departure point, D represents a destination, A→B represents a route of taking a bus, and B→C represents a route of taking a train. A search condition ("departure point: O", "destination: D", and "arrival time: before 10:55") is displayed in a display field denoted by a reference numeral 1012. A search result is displayed in a display field denoted by a reference numeral 1013. In this example, for the search condition of "departure point: O", "destination: D", and "arrival time: before 10:55" displayed in the display field 1012, an "alternative plan" of a movement route presented in S917 in FIG. 9 and a "plan 1" of a movement route presented in S918 in FIG. 9 are displayed in the display field 1013.

As described above, since the user apparatus 20 determines whether the user likes the movement route by using the utility calculation model and presents the movement route determined to be liked by the user, the user can appropriately select a movement route according to an intention of the user. The movement route presentation unit 214 may transmit information about the movement route presented to the user to the transport allocation planning apparatus 10, and the transport allocation planning apparatus 10 may estimate a movement demand of the user or create a transport allocation plan based on the information.

FIG. 11 is a flowchart showing a processing (hereinafter, referred to as a transport allocation plan creation processing S1100) executed when the transport allocation planning unit 113 of the transport allocation planning apparatus 10 creates a transport allocation plan. Hereinafter, the transport allocation plan creation processing S1100 will be described with reference to FIG. 11.

First, the transport allocation planning unit 113 makes the above-described inquiry to the user (user apparatus 20) existing in a target region (S1111). When the user apparatus 20 receives the inquiry, the user apparatus 20 executes the inquiry answering processing S700 shown in FIG. 7, and transmits an answer to the transport allocation planning apparatus 10.

Subsequently, the transport allocation planning unit 113 receives the answer to the inquiry from the user apparatus 20 (S1112).

Subsequently, based on the received answer, the transport allocation planning unit 113 selects a user who is assumed to accept a transport allocation plan (for example, an arrangement of a temporary bus) to be created (S1113).

Subsequently, the transport allocation planning unit 113 transmits a transport allocation plan and an inquiry about whether the transport allocation plan is accepted to the user apparatus 20 of the selected user (S1114), and receives an answer to the inquiry from the user apparatus 20 (S1115).

Subsequently, the transport allocation planning unit 113 creates a transport allocation plan based on the received answer (S1116). The transport allocation plan is created such that, for example, utility of each user (user apparatus 20) is transmitted to the transport allocation planning apparatus 10, and the transport allocation planning unit 113 maximizes all pieces of utility of a plurality of users, that is, a constraint violation is minimized in a case where utility of the users is modeled as a constraint equation and a penalty function when the utility of the users deviates from the constraint equation.

Subsequently, the transport allocation planning unit 113 transmits a result of the created plan to a device that uses the result of the created plan, such as an operation management system (S1117).

As described above, the transport allocation planning system 1 according to the present embodiment can create a transport allocation plan according to a movement demand of the user without acquiring information related to a user behavior (for example, sensor information acquired by the sensor device 107 of the user apparatus 20) by the transport allocation planning apparatus 10, and can provide the created transport allocation plan to an operation management system or the like.

As described above, the analysis processing unit 114 of the transport allocation planning apparatus 10 analyzes the inquiry result 151, and a result of the analysis is managed as the analysis result 154 by the storage unit 110. For example, the analysis result 154 can be used for estimating a user demand by the demand estimation unit 112 and creating a transport allocation plan by the transport allocation planning unit 113. Further, the analysis result 154 can be used for marketing, a regional characteristic analysis, and the like.

FIG. 12 is a flowchart showing a processing (hereinafter, referred to as a similarity calculation processing S1200) executed by the similarity calculation unit 1141 of the analysis processing unit 114. Hereinafter, the similarity calculation processing S1200 will be described below with reference to FIG. 12.

First, the similarity calculation unit 1141 selects two users to be compared from the inquiry result 151 (S1211).

Subsequently, the similarity calculation unit 1141 acquires information of each selected user from the inquiry result 151 (S1212).

Subsequently, the similarity calculation unit 1141 calculates similarity (for example, cosine similarity) of the acquired information of each user (S1213). The similarity calculated by the similarity calculation unit 1141 is stored in the storage unit 110 as the analysis result 154.

The similarity calculation unit 1141 executes the similarity calculation processing S1200 for, for example, combinations of all users included in the inquiry result 151.

Accordingly, it is possible to specify users to be handled in the same rank in estimating a user demand by the demand estimation unit 112, creating a transport allocation plan by the transport allocation planning unit 113, or the like, and a transport allocation plan can be efficiently created by providing a common transportation means to, for example, users having similar preferences.

FIG. 13 is a flowchart showing a processing (hereinafter, referred to as a clustering processing S1300) executed when the clustering unit 1142 of the analysis processing unit 114 executes user clustering (classification). Hereinafter, the clustering processing S1300 will be described with reference to FIG. 13.

First, the clustering unit 1142 receives, via the input device 104, setting of a plurality of users to be clustered (S1311). The plurality of users to be clustered may be set in advance and stored in the transport allocation planning apparatus 10 in advance. All users in the inquiry result 151 may be users to be clustered.

Subsequently, the clustering unit 1142 acquires information of each of the plurality of users to be clustered from the inquiry result 151 (S1312).

Subsequently, the clustering unit 1142 vectorizes the acquired information of each user (S1313).

Subsequently, the clustering unit 1142 clusters the vectorized information by a predetermined clustering method such as a k-means method (S1314).

Subsequently, the clustering unit 1142 generates information indicating a clustering result (S1315). The generated information is stored in the storage unit 110 as the analysis result 154.

By using the analysis result 154 obtained in the clustering processing S1300 described above, for example, a tendency of a user (such as preference of walking, preference of stairs, dislike of waiting, and dislike of a detour) can be known and can be used for marketing, a regional characteristic analysis, or the like.

As described above, according to the transport allocation planning system 1 of the present embodiment, since utility is calculated by the user apparatus 20 by substituting the sensor information to the utility calculation model and an answer generated based on the utility is transmitted from the user apparatus 20 to the transport allocation planning apparatus 10, a transport allocation plan can be created according to a user intention without transmitting the sensor information (information related to a behavior) to the transport allocation planning apparatus 10 while protecting personal information and privacy-related information of the user.

Although the invention has been described in detail based on the embodiments, the invention is not limited to the embodiments described above, and various modifications can be made without departing from the scope of the invention. For example, the embodiments described above have been described in detail for easy understanding of the invention, and the invention is not necessarily limited to those including all configurations described above. Further, a part of the configurations of the embodiments described above may be added to or replaced with another configuration, or may be deleted.

The above-described configurations, functional units, processing units, processing methods, and the like may be implemented by hardware, for example, by designing a part of or all of the configurations, functional units, processing units, processing methods, and the like in an integrated circuit. Further, the above-described configurations, functions, and the like may be implemented by software by interpreting and executing a program for implementing respective functions by a processor. Information for implementing each function, such as a program, a table, and a file, can be stored in a recording device such as a memory, a hard disk, and a solid state drive (SSD), or in a recording medium such as an IC card, an SD card, and a DVD.

Control lines or information lines in the drawings indicate what is considered necessary for explanation, and not all of the control lines or information lines are necessarily shown in an implementation. In practice, it may be considered that almost all of the configurations are connected to one another, for example.

An arrangement form of various functional units, various processing units, and various databases of the information processing apparatus described above is merely an example. The arrangement form of various functional units, various processing units, and various databases can be changed to an optimum arrangement form from the viewpoint of performance, processing efficiency, communication efficiency, and the like of hardware and software provided in the information processing apparatus.

REFERENCE SIGN LIST 1 transport allocation planning system
5 communication network
10 transport allocation planning apparatus
20 user apparatus
100 information processing apparatus
104 input device
105 output device
107 sensor device
111 inquiry processing unit
112 demand estimation unit
113 transport allocation planning unit
114 analysis processing unit
1141 similarity calculation unit
1142 clustering unit
151 inquiry result
152 demand estimation result
153 transport allocation plan
154 analysis result
211 model learning unit
212 inquiry answering unit
213 utility calculation unit
214 movement route presentation unit
215 inquiry history presentation unit 251 sensor information
252 model information
253 inquiry history
S500 learning processing
S700 inquiry answering processing
S900 movement route presentation processing
1000 movement route presentation screen
S1100 transport allocation plan creation processing
S1200 similarity calculation processing
S1300 clustering processing

The invention claimed is:

1. A transport allocation planning system comprising:
a transport allocation planning apparatus including a first processor configured to create a transport allocation plan of a transportation facility; and
a user apparatus that is an information processing apparatus, which includes a second processor, which is communicably connected to the transport allocation planning apparatus and which is operated by a user of the transportation facility,
wherein the first processor of the transport allocation planning apparatus is configured to:
transmit, to the user apparatus, an inquiry related to a movement demand which is information indicating an intention related to a movement of the user, and receive an answer to the inquiry,
estimate a movement demand of the user based on the answer, and
create a transport allocation plan based on the estimated movement demand,
wherein the user apparatus includes:
a memory, coupled to the second processor, that stores sensor information that is information indicating a current state or a past state of the user apparatus and a plurality of utility calculation models for respectively calculating a utility of the user during a movement, each of the plurality of utility calculation models respectively corresponding to a content of the inquiry from the transport allocation planning apparatus, and each utility calculation model is an equation,
wherein the second processor of the user apparatus is configured to:
receive the inquiry from the transport allocation planning apparatus and acquires the at least one utility calculation model among the plurality of utility calculation models based on the content of the inquiry,
calculate the utility of the user by applying the sensor information to the acquired utility calculation model, and
generate, based on the utility, an answer to the inquiry received from the transport allocation planning apparatus, and transmits the generated answer to the transport allocation planning apparatus.

2. The transport allocation planning system according to claim 1,
wherein the second processor of the user apparatus is configured to:
calculate, for the inquiry received from the transport allocation planning apparatus, the utility of each of the plurality of utility calculation models by applying the sensor information to each of the plurality of utility calculation models, and
transmit, to the transport allocation planning apparatus, an answer generated based on utility of a utility calculation model having highest utility among the plurality of utility calculation models.

3. The transport allocation planning system according to claim 1,
wherein the second processor is of the user apparatus is configured to:
acquire the utility calculation models matching a search condition of a movement route of the user, calculate the utility by applying the sensor information to the utility calculation models, generate a movement route corresponding to a utility calculation model having highest calculated utility, and present the generated movement route to the user.

4. The transport allocation planning system according to claim 1,
wherein when transmitting the inquiry to the user apparatus, the first processor of the transport allocation planning apparatus is configured to transmit information designating a utility calculation model to be used when the user apparatus generates the answer,
wherein when the inquiry is received, the second processor of the user apparatus is configured to:
calculate the utility by applying the sensor information to the utility calculation model designated by the information, and
transmit the answer generated based on the utility to the transport allocation planning apparatus.

5. The transport allocation planning system according to claim 1,
wherein the second processor of the user apparatus is configured to learn the utility calculation models based on the sensor information by determining variables in the respective equations of each utility calculation model.

6. The transport allocation planning system according to claim 1,
wherein the user apparatus further includes a memory that stores inquiry history which is information obtained by associating the content of the inquiry with a content of the answer to the inquiry, and
wherein the second processor of the user apparatus is configured to output a content of the inquiry history.

7. The transport allocation planning system according to claim 1,
wherein the transport allocation planning apparatus further includes a memory that stores answers of all users received from a plurality of user apparatuses, and
wherein the first processor of the transport allocation planning apparatus is configured to:
calculate a similarity of the answers of all the users, and
use the similarity when estimating a movement demand of the user.

8. The transport allocation planning system according to claim 1,
wherein the transport allocation planning apparatus further includes a memory that stores answers of all users received from a plurality of user apparatuses, and
wherein the second processor of the transport allocation planning apparatus is configured to:
cluster the users based on the answers of all the users, and
use the clustering result when estimating a movement demand of the user.

9. An information processing apparatus functioning as the transport allocation planning apparatus in the transport allocation planning system according to claim 1,
wherein the first processor is configured to transmit, to a user apparatus, an inquiry related to a movement demand which is information indicating an intention related to a movement of a user, and receive an answer to the inquiry, estimate a movement demand of the user based on the answer, and create a transport allocation plan based on the estimated movement demand.

10. An information processing apparatus functioning as the user apparatus in the transport allocation planning system according to claim 1, wherein the second processor is configured to:

store, in a memory, sensor information that is information indicating a current state or a past state of the information processing apparatus and a utility calculation model for calculating utility of a user during a movement, calculate the utility of the user by applying the sensor information to the utility calculation model, and generate, based on the utility, an answer to an inquiry received from the transport allocation planning apparatus, and transmit the generated answer to the transport allocation planning apparatus.

11. A method for controlling a transport allocation planning system including a transport allocation planning apparatus that is an information processing apparatus which creates a transport allocation plan of a transportation facility and a user apparatus that is an information processing apparatus which is communicably connected to the transport allocation planning apparatus and which is operated by a user of the transportation facility, the method for controlling a transport allocation planning system comprising:

the transport allocation planning apparatus executing:

a step of transmitting, to the user apparatus, an inquiry related to a movement demand which is information indicating an intention related to a movement of the user, and receiving an answer to the inquiry;

a step of estimating a movement demand of the user based on the answer; and a step of creating a transport allocation plan based on the estimated movement demand; and the user apparatus executing:

a step of storing sensor information that is information indicating a current state or a past state of the user apparatus and a plurality of utility calculation models for respectively calculating a utility of the user during a movement, each of the plurality of utility calculation models respectively corresponding to a content of the inquiry from the transport allocation planning apparatus, and each utility calculation model is an equation;

a step of receiving the inquiry from the transport allocation planning apparatus and acquiring the at least one utility calculation model among the plurality of utility calculation models based on the content of the inquiry;

a step of calculating the utility of the user by applying the sensor information to the acquired utility calculation model; and a step of generating, based on the utility, an answer to the inquiry received from the transport allocation planning apparatus, and transmitting the generated answer to the transport allocation planning apparatus.

12. The method for controlling a transport allocation planning system according to claim 11, further comprising:

the user apparatus executing:

a step of calculating, for the inquiry received from the transport allocation planning apparatus, utility based on each of the plurality of utility calculation models by applying the sensor information to each of the plurality of utility calculation models; and a step of transmitting, to the transport allocation planning apparatus, an answer generated based on utility of a utility calculation model having highest utility among the plurality of utility calculation models.

13. The method for controlling a transport allocation planning system according to claim 11, further comprising:

the user apparatus executing:

a step of acquiring the utility calculation models matching a search condition of a movement route of the user, calculating utility by applying the sensor information to the utility calculation models, generating a movement route corresponding to a utility calculation model having highest calculated utility, and presenting the generated movement route to the user.

14. The method for controlling a transport allocation planning system according to claim 11, further comprising:

the transport allocation planning apparatus executing a step of, when transmitting the inquiry to the user apparatus, transmitting information designating a utility calculation model to be used when the user apparatus generates the answer; and the user apparatus executing:

a step of calculating utility by applying the sensor information to the utility calculation model designated by the information when the inquiry is received; and a step of transmitting the answer generated based on the utility to the transport allocation planning apparatus.

15. The method for controlling a transport allocation planning system according to claim 11, further comprising:

the user apparatus executing a step of learning the utility calculation models based on the sensor information by determining variables in the respective equations of each utility calculation model.

* * * * *